Aug. 11, 1953     A. O. WILLIAMS ET AL     2,648,714
HOOD FOR ELECTRIC FURNACE

Filed April 1, 1950     10 Sheets-Sheet 1

INVENTORS
AUDLEY O. WILLIAMS,
WALTER G. McBURNEY,
BY
Charles L. Harness
ATTORNEY Aug. 11, 1953 A. O. WILLIAMS ET AL 2,648,714
HOOD FOR ELECTRIC FURNACE
Filed April 1, 1950 10 Sheets-Sheet 3

INVENTORS
AUDLEY O. WILLIAMS.
WALTER G. McBURNEY,
BY
Charles L. Harness
ATTORNEY

Aug. 11, 1953  A. O. WILLIAMS ET AL  2,648,714
HOOD FOR ELECTRIC FURNACE
Filed April 1, 1950  10 Sheets-Sheet 6

INVENTORS
AUDLEY O. WILLIAMS,
WALTER G. McBURNEY,
BY
Charles L. Harness
ATTORNEY Patented Aug. 11, 1953

2,648,714

UNITED STATES PATENT OFFICE 2,648,714

HOOD FOR ELECTRIC FURNACE

Audley O. Williams and Walter G. McBurney, Niagara Falls, Ontario, Canada, assignors to American Cyanamid Company, New York, N. Y., a corporation of Maine Application April 1, 1950, Serial No. 153,398

10 Claims. (Cl. 13—23)

1

The present invention relates to an improved hood for calcium carbide furnaces.

In making calcium carbide, lime (CaO), and coke are fused in an electric furnace at temperatures ranging from 1600°–3000° C. In this process a great deal of carbon monoxide is evolved, which, in the open type of carbide furnace, is allowed to burn and pass up the stack along with great quantities of lime and coke dust. In attempts to recover by-product carbon monoxide and to abate the dust nuisance, the totally sealed type of furnace has been developed, in which the upper surface is sealed, the lime coke charge is added through openings, and by-product gases and dust are led off through surface ducts. The sealed type of furnace, however, is subject to serious disadvantages, the principal of which being the difficulty experienced in giving proper attention to the charge to keep it feeding uniformly and prevent formation of a hard crust. There also is present a large volume of gas under the cover which constitutes a serious explosion hazard.

As a compromise between the open and closed type of carbide furnaces, the "semi-sealed" carbide furnace system of the present invention has been developed. In this furnace, hoods are set between the electrodes and cover only about 45% to 75% of the surface area of the charge. Each hood is connected to a duct fixed in the furnace wall and by maintaining a slight suction in the duct, about 75% of the carbon monoxide and 85% of the dust are led away through the furnace charge and into a recovery unit. When operating the semi-sealed type of furnace it is important not to use too low a pressure in the ducts; otherwise, air above the furnace charge will be drawn into the hoods and ducts along with the carbon monoxide, with consequent loss of carbon monoxide due to burning. In operating the semi-sealed furnace, therefore, it is necessary to permit the escape of a small amount of carbon monoxide, which is allowed to burn at the top of the charge, thereby serving as an indicator of proper pressure balance in the duct system.

It is an object of this invention to recover combustible gases in dust-free utilizable form from a semi-sealed calcium carbide furnace. Another object is to abate the dust nuisance customarily attending the operation of a calcium carbide furnace.

It is also an object of this invention to provide a furnace hood of very long life, which can be placed in the furnace or removed from it with

2 negligible loss of operating time. It is a further object to provide a hood, the halves of which are substantially completely electrically insulated from each other, and in which water may be excluded from the lower pipes in the event of failure, so that the hood may still be operated without the necessity of an immediate shut-down.

It is an object of the present invention to provide, in combination, a calcium carbide furnace and accessory hood system, in which the disadvantages of the sealed furnace are largely eliminated. It is a further object to provide a hood system for a carbide furnace characterized by its simplicity, ease of installation and replacement, and long operating life.

These and other objects will be evident from the description below.

Fig. 2-a is a modification of Fig. 2, showing a fume duct built integrally into the furnace.

Fig. 3 also shows the hood assembly at the water supply end.

Fig. 19 is analogous to Fig. 16, except that the gases are withdrawn from a side exit system. Fig. 19-a shows a means of electrically insulating the halves of the piping of the hoods of Fig. 19.

Figure 1:
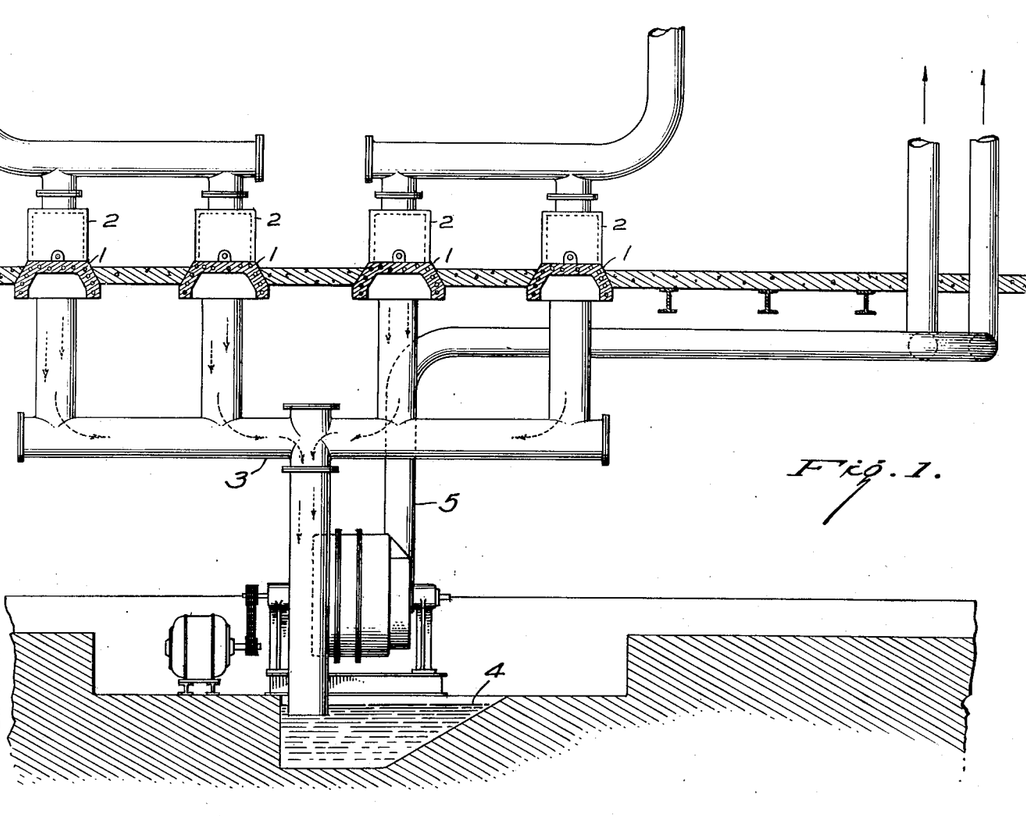
Fig. 1 represents a rear elevation of calcium carbide furnace and shows the dust collection assembly with two hoods in section.

Referring to Fig. 1, the hood in cross-section is shown at 1 where it sits on the base of fume duct 2. The duct enters the dust scrubbing assembly at 3, which leads to water trap 4. Uptake duct assembly 5 leads the scrubbed gases into a recovery unit (not shown) or may vent them to the atmosphere. On either side of the hoods are suspended the customary electrodes, such as Soderberg electrodes or the like (not shown).

Figure 2:
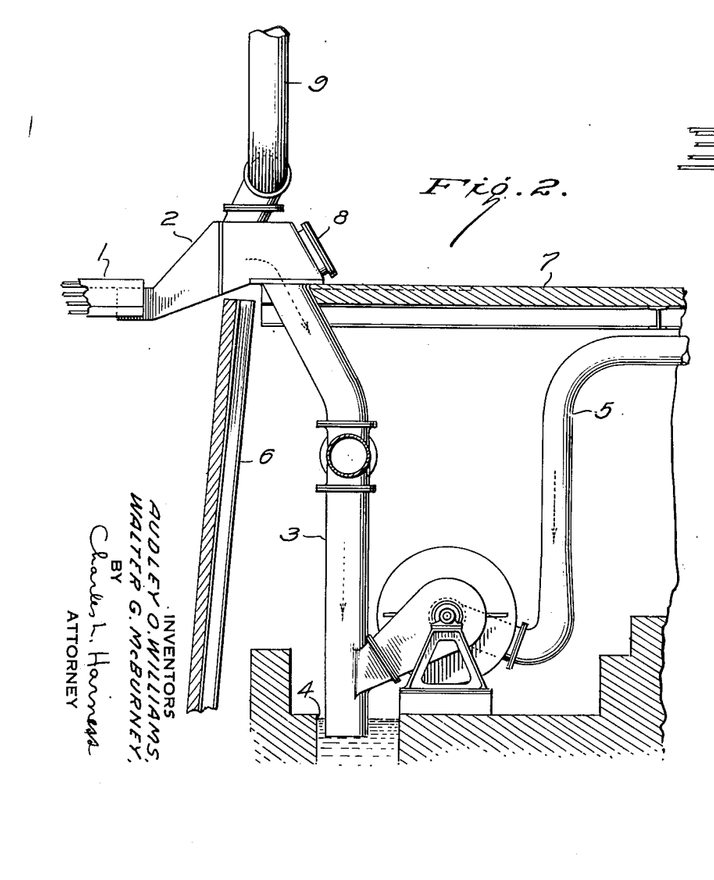
Fig. 2 is a sectional view of Fig. 1 taken along the line 2—2 and looking in the direction of the arrows, and shows more clearly the fume scrubbing system with relation to an individual hood.
Figure 2A:
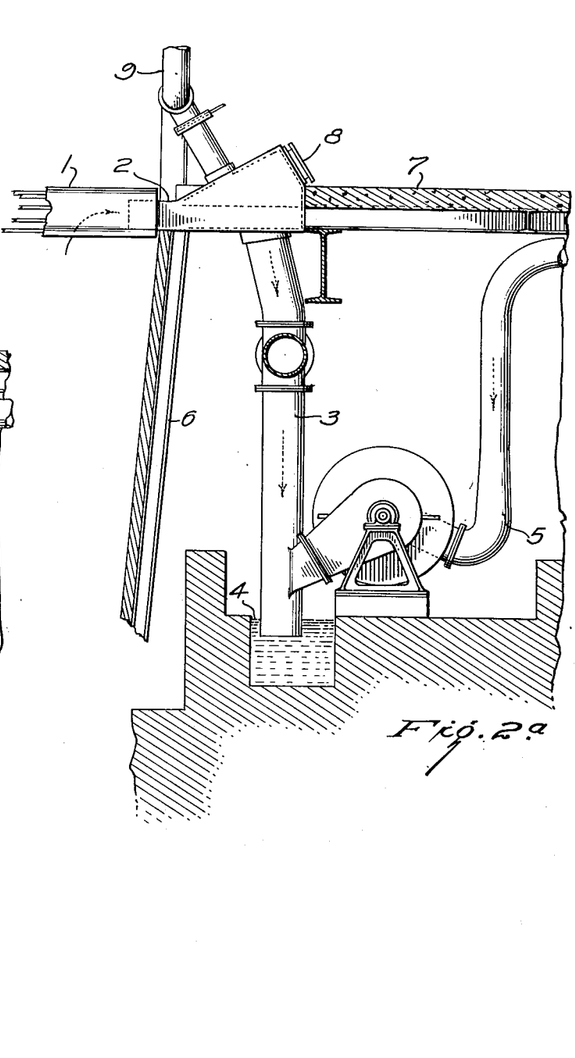

Referring to Fig. 2, at 2 is shown the fume duct base generally. It will be seen that the duct is positioned over the furnace side wall 6 and is affixed to the upper floor 7 of the furnace room, extending over the wall into the furnace proper and down through and under the room floor. While Fig. 2 shows a convenient means for installing the dust recovery system of this invention to an existing calcium carbide furnace without extensive alternations, when building a new furnace which would incorporate the invention, it is preferred to build the fume duct 2 through the furnace wall rather than to build the duct over the furnace wall; and such preferred embodiment is shown in Figs. 2—2a. A clean-out door 8 provides access to the interior of the fume duct 2, and a duct 9, provided to take gases away from furnace during inspection or repairs to the gas cleaning assembly, is connected directly to fume duct 2.

Figure 3:
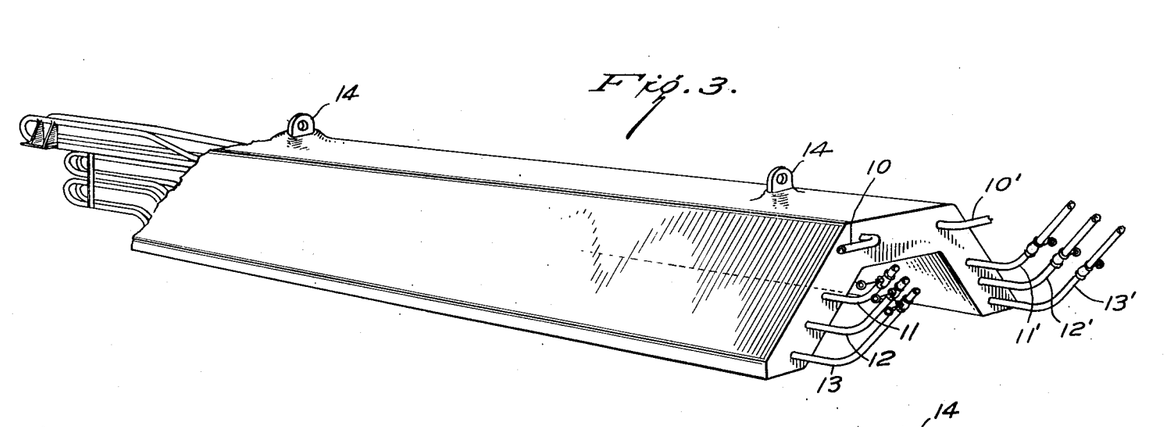
Fig. 3 shows a complete individual hood with the refractory covering broken away at the far end to show the piping assembly at that end.

Referring to Fig. 3, pipe termini 10, 11, 12 and 13 (and 10′, 11′, 12′ and 13′ in the other half of the assembly) lead to water connections (not shown) in the furnace room floor. In normal operation water flows into the pipe assembly at 10, out through 11, which is exteriorly connected to 12 by cross piping (not shown), back in through 12, and finally out through 13. However, in the event flaws develop in 12 or 13 by reason of burn-out, corrosion, or from other causes, water is shut out of the 12—13 circuit by turning off their respective valves and taking all the exit flow from 11 instead of 13. The same arrangement is followed for the pipes in the other side of the hood. At 14 are shown crane hook tabs for lowering the hood into the furnace, or for removing it.

Figure 5:
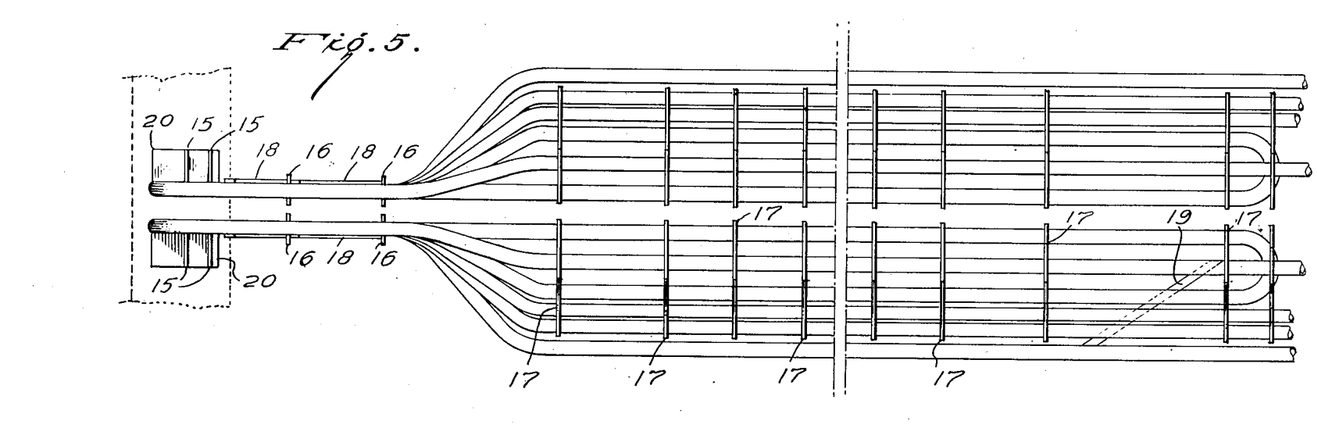
Fig. 5 is a plan elevation of the interior piping system of the hood and Fig. 6 is a side elevation of the same piping.
Figure 6:
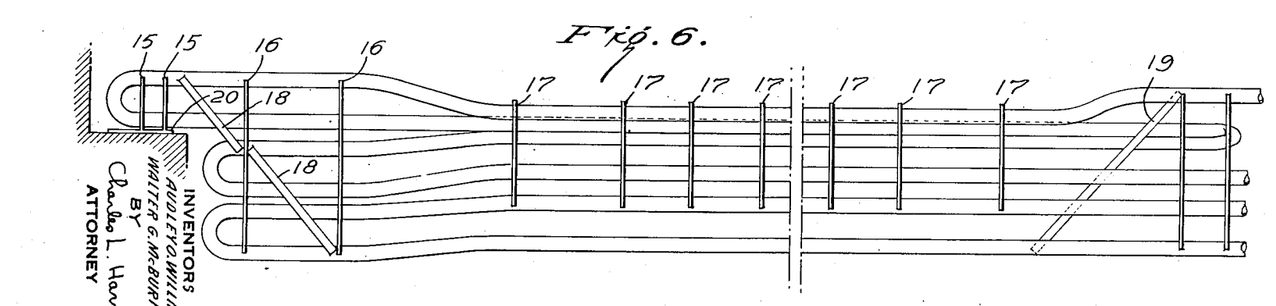
Figure 7:
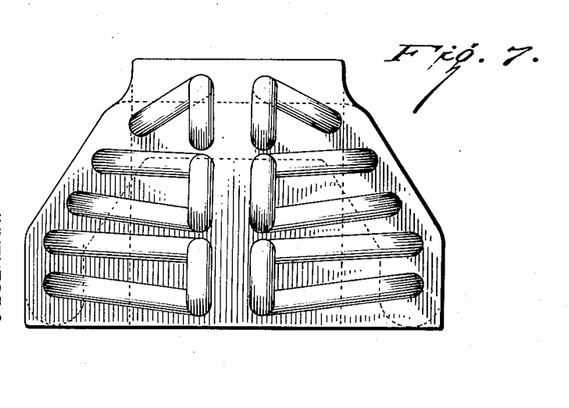
Fig. 7 is a rear elevation of Fig. 4 and shows the piping assembly of the hood interior.

The course of water circulation within the hood may be traced in the piping assemblies as shown in Figs. 5 and 6, which figures also show a means of holding in position the pipes of each subassembly, i. e., by means of sectional bracing members 15, 16 and 17, and diagonal braces 18 and 19. Terminal rest pieces 20 provide secure contact of the rear end of the hood with a ledge in the rear furnace wall.

Figure 4:
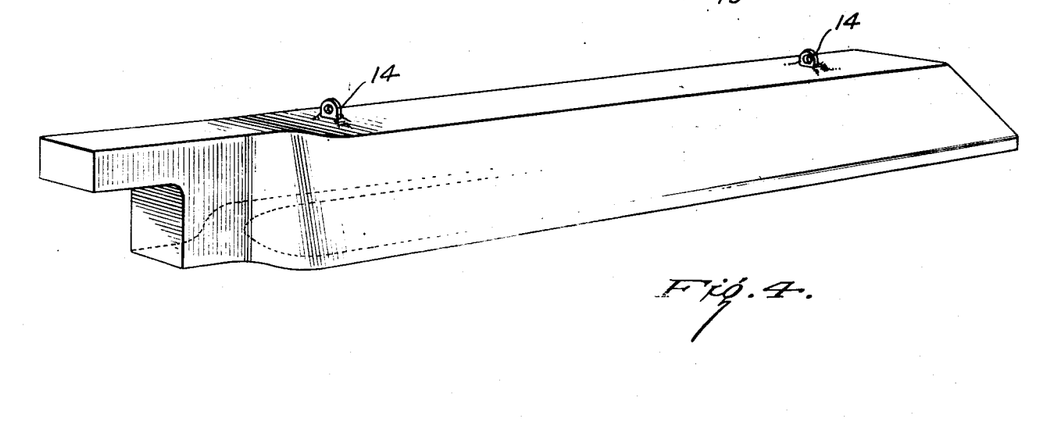
Fig. 4 shows the hood completely covered with a monolithic layer of refractory cement.
Figure 8:
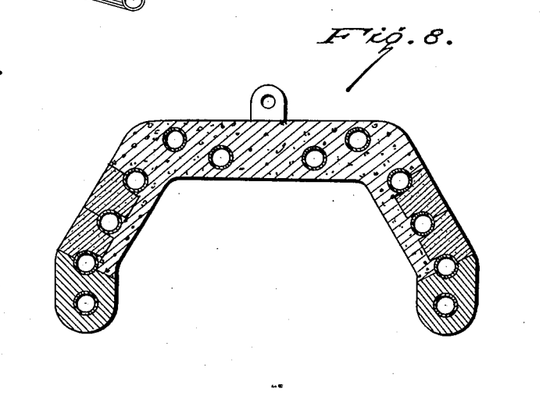
Fig. 8 is a sectional view of Fig. 4 taken along the line 8—8 and looking in the direction of the arrows.
Figure 9:
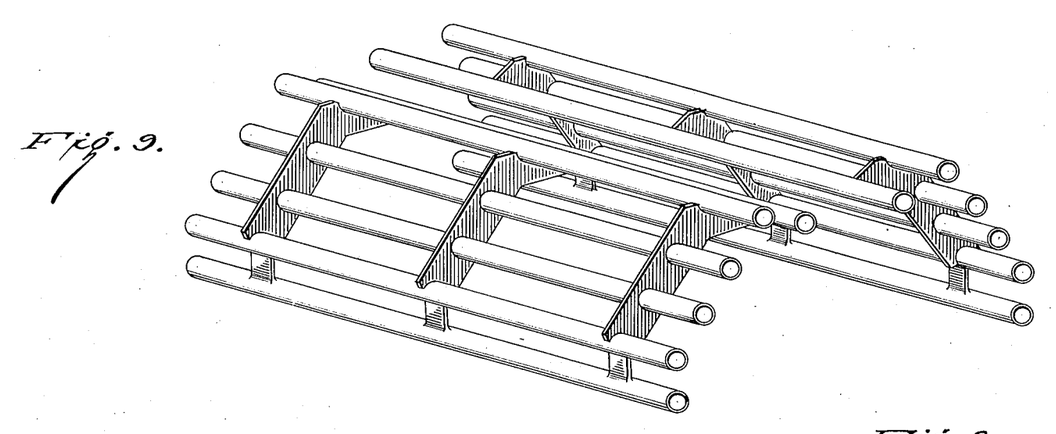
Fig. 9 shows the piping assembly of the hood in relation to the bracing members.
Figures 10, 11, 12, 13, 15:
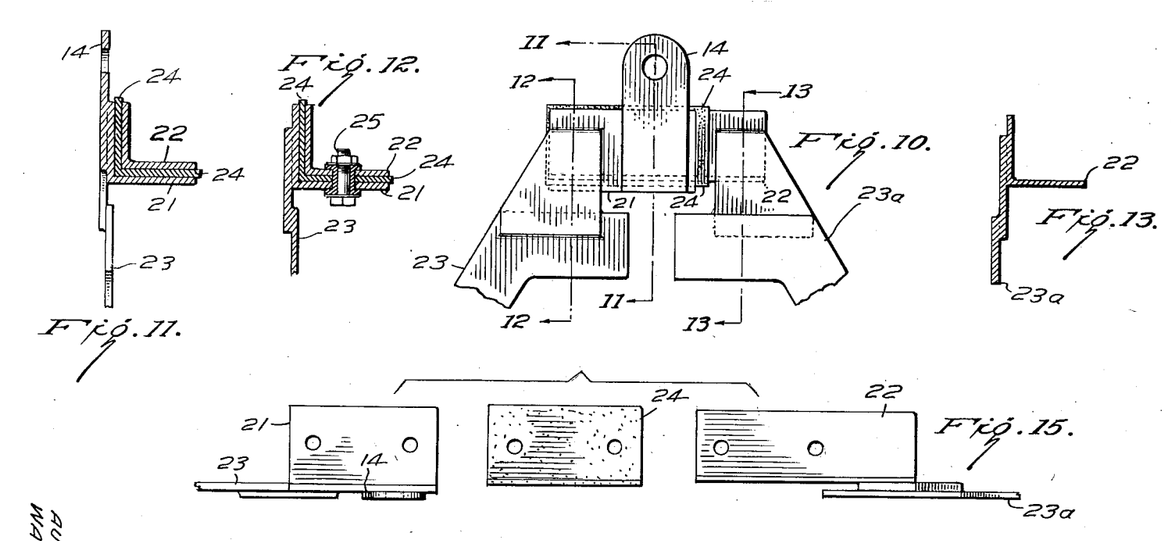
Fig. 10 shows the method of joining the two halves of the piping assembly in electrically insulated relationship.
Figs. 11, 12, and 13 are sectional views of Fig. 10 taken along the lines 11—11, 12—12, and 13—13, respectively, looking in the direction of the arrows.
Fig. 15 is a plan elevation of the same view.
Figure 14:
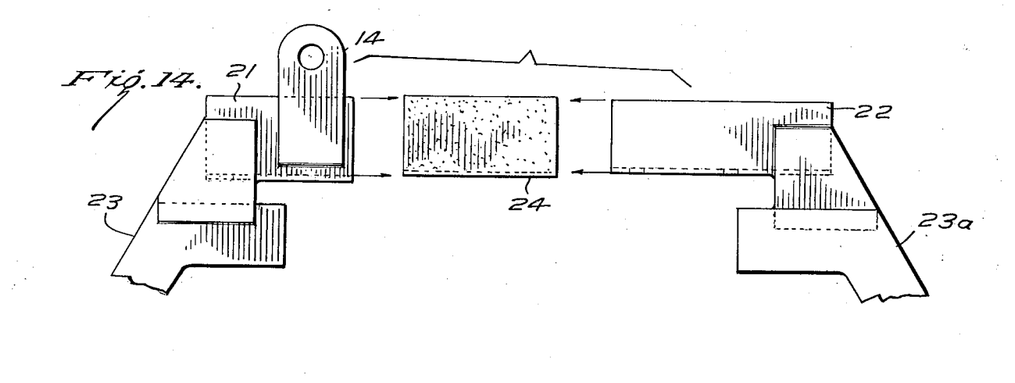
Fig. 14 shows a separated view of the assembly of Fig. 10

Fig. 8, which is a cross-section of the hood of Fig. 4 along the line 8—8 looking in the direction of the arrows, shows the spacing of the pipes within bracing members 15. The pipe skeleton with its supporting braces is filled in and covered with refractory brick and mortar as shown. While it is not absolutely necessary, the life of the hood is sensibly prolonged by coating substantially the whole with a layer of refractory cement to provide a monolithic surface. Owing to the basic nature of the furnace charge, it is preferred that the brick and mortar be of a basic or neutral character. Brick such as is used in the hearth of a blast furnace and a cast monolithic refractory similar to that commonly used in boiler settings have been found to give excellent service.

It has been found that the life of the hood is greatly increased if the water pipes in opposite halves of the hoods are completely electrically insulated from one another. An excellent means of doing this is shown in Figs. 10-15 inclusive. In these figures, the metal angle extensions 21 and 22 of the two framing members 23 and 23-a are separated by a thick heat resistant dielectric 24, such as compressed asbestos, or asbestos mixed with Portland cement and then compressed into the angle shape shown. The three angles are bolted together using a dielectric assembly of washers and bushing as shown at 25 in Fig. 12. The crane tab 14 is preferably attached to the assembly at this point, as by welding or the like.

When used with a rectangular carbide furnace, the hoods are lowered into place between the furnace electrodes. The lime-coke charge is then built up around the hoods by means of the customary overhead feeders, and preferably spread over the hoods to a depth of several inches. By so submerging the hoods in the charge, the flow of gases within the charge is more easily regulated. The suction assembly 3 of Fig. 1 is adjusted so that only a slight flame burns around the electrodes, indicating that almost all gases are being drawn off through the scrubbing system. It is preferred to maintain a small amount of combustion above the charge as a convenient means of showing that no air is being drawn down through the charge and into the hoods. Such air would burn and/or dilute the gas or might create an explosion hazard in the recovery system. A pressure differential of about 0.2 mm. of mercury from atmospheric pressure will ordinarily suffice to accomplish the desired vacuum, though obviously this figure may vary from installation to installation.

The excellent results obtained with the hood of this invention are attributable in part to the fact that it may be lowered into position without bolting or other fastening, and that its two cooling assemblies are completely electrically insulated from one another, thus eliminating overheating by vagabond currents.

The operation of the hood in connection with the delta furnace is analogous to the above described operation of the rectangular furnace.

Figures 16, 17:
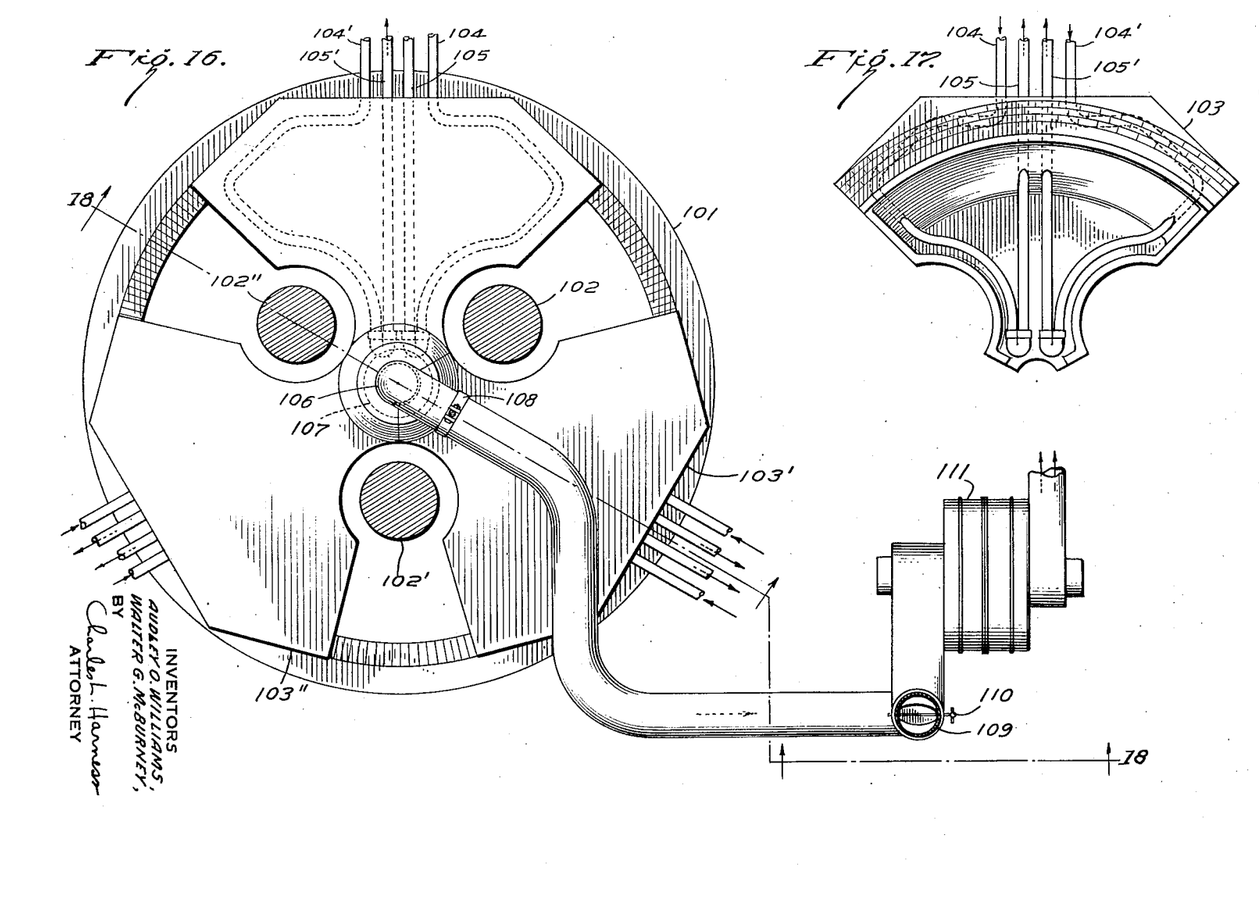
Fig. 16 represents a plan elevational view of a furnace having the electrodes arranged in a triangle or delta with the hood and dust recovery system of the present invention in place, the electrodes being shown in section.
Fig. 17 shows the underside of an individual delta furnace hood.
Figure 18:
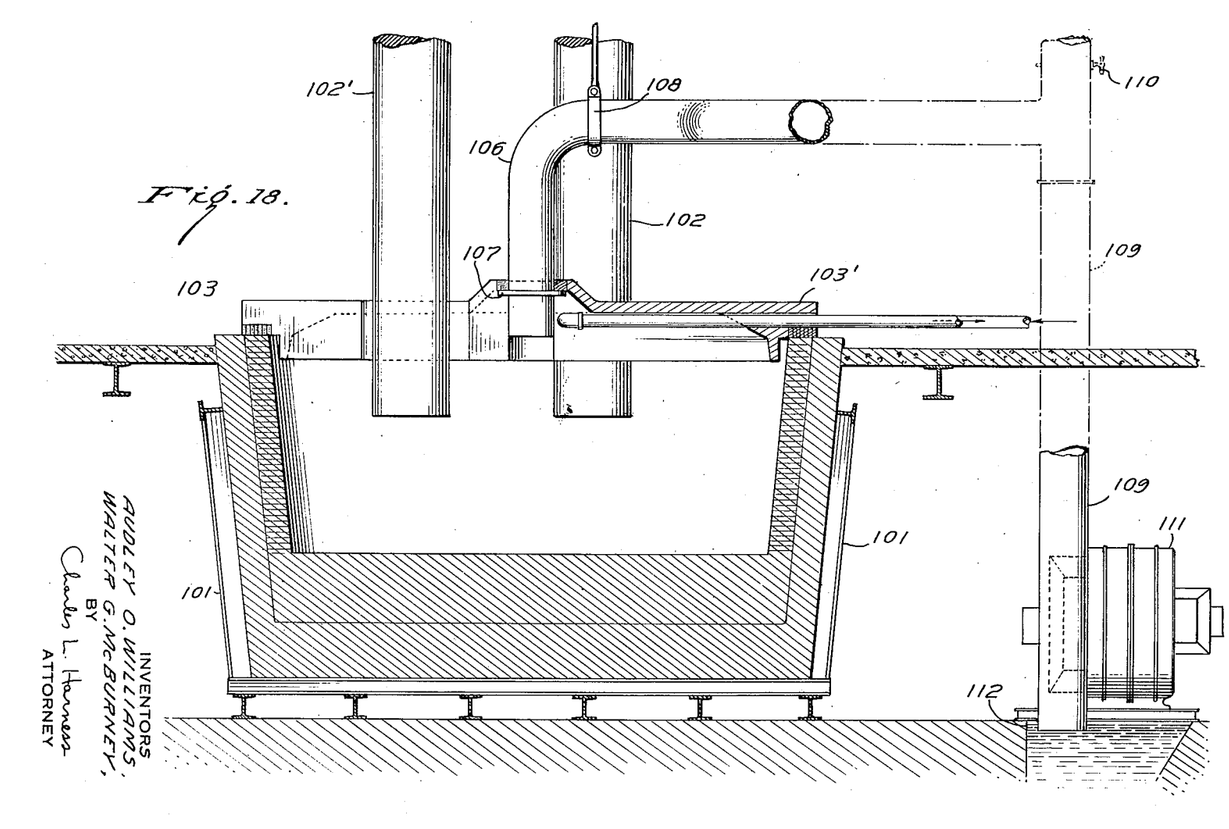
Fig. 18 is a side sectional view of Fig. 16, partly in elevation, taken along the line 18—18 looking in the direction of the arrows.

Referring to Fig. 16 at 101 is shown generally a delta furnace of any well known type. At 102, 102′ and 102″ are shown the customary carbon electrodes. At 103, 103′ and 103″ are the three leaves of the hood system. At 104 and 105, and 104′ and 105′ are shown entrance and exit water-cooling pipes, respectively, for the respective halves of hood 103. At 106 is shown the center exit duct, which is provided with a flange 107, which supports the center edges of the hoods. The center exit duct 106 is itself supported from the ceiling or by other overhead support through assembly 108, shown best in Fig. 18. At 109 is shown, in section, an erect dust recovery pipe or column (shown best in Fig. 18) equipped at 110 with an atmospheric vent valve of any customary design, such as the butterfly type. Dust recovery pipe 109 leads downward to suction means 111 of any well known type, such as a power fan, and terminates in water trap 112, (not shown in Fig. 16 but shown in Fig. 18).

The operation of the hood system and dust recovery system will be evident from the foregoing description. The dust-laden gases are collected by the hood system 103, 103' and 103", and are drawn through center exit duct 106 into dust recovery 109, 111 and 112. The upper portion duct 109, with valve 110 (shown best in Fig. 18), is provided to take gases away from the furnace during inspection or repairs to the dust recovery system.

Despite the relatively large interstices between the hood leaves, a relatively small amount of gas and dust is lost through these openings. It has been found that the flow of the fumes can be controlled with a vacuum amount to about 0.3 inch of water, leaving only a very small flame to burn in the interelectrode open areas. Obviously this figure may vary according to the installation.

The center exit dust recovery system described above, together with the four-pipe cooling system for each hood leaf, is preferred to the side exit system with a two-pipe cooling system, illustrated in Figs. 19 and 20, and described below.

Figures 19, 19A:
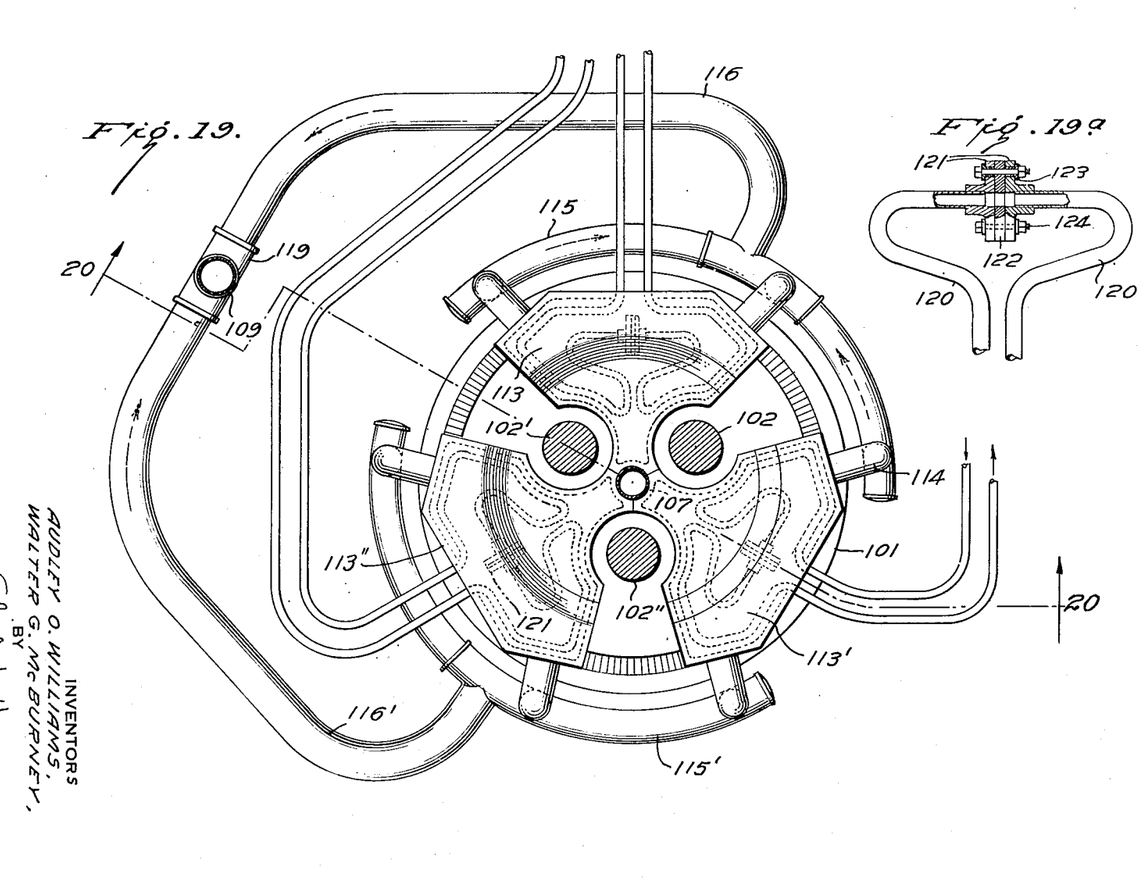
Figure 20:
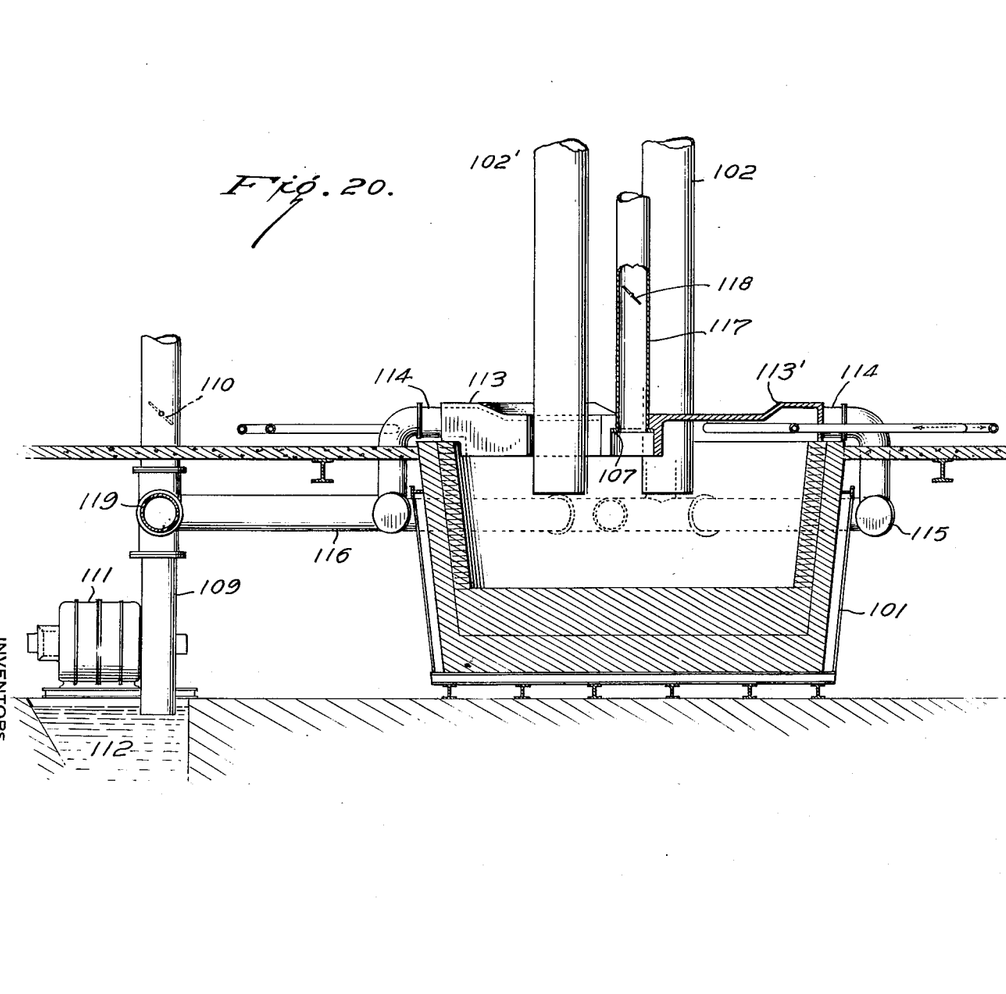
Fig. 20 is a side sectional view of Fig. 19, partly in section, taken along the line 20—20, looking in the direction of the arrows.

In Fig. 19, there is shown at 101 the furnace generally, with electrodes 102, 102' and 102". The three side-exit-type hood leaves at 113, 113' and 113" are shown resting on the furnace edge and on center flange support 107. Gases collected by the hood are drawn off through side exit ducts 114, thence into exhaust manifolds 115 and 115', and thence into secondary collectors 116 and 116'. Central duct 117 (shown in Fig. 20), integral with flange 107, is suspended from overhead and carries valve 118, normally closed, but which may be opened to vent the gases into the atmosphere when the dust collecting system is shut down for repairs or the like. The secondary collectors 116 and 116' are united in coupling 119, beneath which is dust recovery column 109, with its accompanying suction fan 111 and water trap 112. Said dust recovery column and accessories are not shown in Fig. 19, but are shown in Fig. 20; they are analogous to the dust recovery assembly of Fig. 18.

Fig. 19-a shows a means of electrically insulating the two halves of the piping of each hood in Fig. 19. At 120 is shown the pipe, bearing flange 121. The respective flanges are joined in abutment to refractory electrical insulating gasket 122 by means of bolts 124 inserted through refractory insulating sleeves 123.

Hood structure for delta furnace

The individual hood leaf is formed essentially of monolithic refractory cement, preferably of a basic character, such as that used in boiler settings, as a covering over the piping framework, as shown in Fig. 17. As shown therein, a preferable embodiment of the invention is to form the hood of refractory brick at the points of greatest abrasion, as where the hood rests on the furnace edge and on the center support flange. The hoods need not be provided with semi-permanent fastenings for bolting to the furnace. It is, in fact, a primary advantage of the invention that the hood may be put in place and removed without being fastened or unfastened to or from the furnace structure. It is further preferred, in building the hood, to insulate the pipe skeleton electrically, as by coating same with refractory cement or the like.

The pipes sections are insulated from each other with insulating refractories where joined in the structure, and externally by rubber connections. It is essential that each half of the individual hoods be thoroughly electrically insulated from the other, the furnace, and the electrodes. Otherwise, stray currents tend to overheat the hoods and reduce hood life. A method of insulating the two halves of the piping of Figs. 19 and 20 by means of a refractory gasket is shown in Fig. 19-a.

With either of the two modifications, central exit and side exit hoods, the furnace is charged in the same manner. The lime-coke charge is dropped through overhead feed means, customary in the carbide furnace art, into the interhood spaces. In using large delta furnaces, it is preferred to build up the charge so that the hoods are immersed in it to a depth of a few inches. This has the effect of reducing the escape of dust and gas. In smaller delta furnaces, it is not necessary to bury the hoods, as the proper suction can be maintained without excess loss of gas.

It may be noted that the piping contours within the hoods in Figs. 16–20 is largely arbitrary, and that any configuration of the cooling piping is satisfactory so long as it provides the necessary cooling. A more variegated contour such as that of Figs. 19 and 20 will naturally provide more cooling effect and greater support to the hood than that of Figs. 17 and 18.

While the invention has been described with particular reference to specific embodiments, it is to be understood that it is not to be limited thereto but is to be construed broadly and restricted solely by the scope of the appended claims.

We claim:

1. An interelectrode hood adapted to seat freely on a fume duct of an electric furnace for the preparation of calcium carbide, said hood comprising an upper surface with downwardly extending sides containing paired assemblies of spaced heat resistant pipes, said assemblies being electrically insulated from each other and being adapted to circulate a cooling medium and being substantially covered with a refractory material; the hood sides extending downward far enough that when the hood is in place on the normally operated furnace, the hood sides are immersed in the furnace charge, whereby a vapor collection zone is provided within the hood.

2. The hood according to claim 1 in which one end consists of a flattened edge rest adjacent to a dropped shoulder, said edge being adapted to sit on an abutting support on the carbide furnace wall, the other end of the hood having a shape adapted substantially to cover a fume duct at the opposite furnace wall.

3. The hood according to claim 2 in which each of the paired pipe assemblies comprises at least two sub-assemblies arranged to permit the exclusion of cooling medium from any of the said sub-assemblies.

4. The hood according to claim 3 in which one end comprises a flattened edge rest adapted to sit on one edge of the furnace wall, and the other end is shaped substantially to cover a frame duct in the opposite furnace wall; each of said paired pipe assemblies comprising two sub-assemblies, an upper and a lower, arranged to permit exclusion of cooling medium from each of said sub-assemblies.

5. In combination, an electric furnace for the preparation of calcium carbide comprising an open vessel, a plurality of spaced electrodes depending into the same, and a plurality of fume ducts; a plurality of hoods positioned between the said electrodes so as to cover about 45-75% of the furnace surface, said hoods being positioned separably on said fume ducts, each of said hoods comprising an upper surface with sides extending downward far enough so that the said sides are immersed in the furnace charge during furnace operation; said sides containing paired assemblies of spaced heat resistant pipes adapted to circulate a cooling medium; said pairs being electrically insulated from each other and being substantially covered with a refractory material resistant to calcium carbide furnace conditions; means for supplying a circulating cooling medium to the said cooling pipes; and suction means for drawing fumes from the said fume ducts.

6. An interelectrode hood for a delta-type electric furnace, said hood comprising a cover with downwardly-extending sides, the whole being formed of refractory material resistant to furnace conditions and supported by a framework of temperature-resistant pipes, said pipes being adapted to circulate cooling medium and being protected with refractory electrical insulation; the hood sides being spaced from adjacent electrode positions and extending substantially from the furnace center to the furnace periphery; the hood sides extending downwardly so that when the hood is in place on the normally operating furnace; the hood sides are immersed in the furnace charge, whereby a vapor collection zone is provided within the hood.

7. The hood according to claim 6 in which the hood is shaped to rest separably upon and to make a substantially gas-tight fit with a fume duct attached to the furnace.

8. In combination, a delta type electric furnace for the preparation of calcium carbide comprising an open vessel, three symmetrically positioned electrodes depending into same, and fume duct means; three hoods positioned between the said electrodes, so as to cover about 45-75% of the furnace surface, said hoods being supported by the furnace periphery and support means at the center of the furnace surface; each of the said hoods being positioned separably on the said fume duct means, and each of the said hoods comprising an upper surface with sides extending downward far enough so that the said sides are immersed in the furnace charge during furnace operation, said sides containing paired assemblies of spaced heat resistant pipes adapted to circulate a cooling medium, said pairs being electrically insulated from each other and being substantially covered with a refractory material resistant to calcium carbide furnace conditions; means for supplying a circulating cooling medium to the said pipes; and suction means for drawing fumes from the said fume duct means.

9. The hood according to claim 8 in which the suction means is connected to a central confluence of the hoods.

10. The hood according to claim 8 in which the suction means is connected to the hoods at the furnace periphery.

AUDLEY O. WILLIAMS.
WALTER G. McBURNEY.

References Cited in the file of this patent

UNITED STATES PATENTS

| Number | Name | Date |
| --- | --- | --- |
| 572,312 | Price | Dec. 1, 1896 |
| 826,744 | Price | July 24, 1906 |
| 1,635,819 | Corcoran | July 12, 1927 |
| 1,922,312 | Mansfield | Aug. 15, 1933 |
| 1,992,465 | Blagg | Feb. 26, 1935 |
| 2,222,004 | Smith | Nov. 19, 1940 |
| 2,286,732 | Hardin | June 6, 1942 |
| 2,426,643 | Ridgway | Sept. 2, 1947 |
| 2,448,886 | Hopkins | Sept. 7, 1948 |

FOREIGN PATENTS

| Number | Country | Date |
| --- | --- | --- |
| 443,994 | France | Oct. 7, 1912 |